(12) United States Patent
Jeddeloh

(10) Patent No.: US 6,507,897 B2
(45) Date of Patent: *Jan. 14, 2003

(54) MEMORY PAGING CONTROL APPARATUS

(75) Inventor: Joseph M. Jeddeloh, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/836,951

(22) Filed: Apr. 17, 2001

(65) Prior Publication Data

US 2001/0013082 A1 Aug. 9, 2001

Related U.S. Application Data

(63) Continuation of application No. 09/128,410, filed on Aug. 3, 1998, now Pat. No. 6,219,765.

(51) Int. Cl.[7] .............................................. G06F 13/16
(52) U.S. Cl. ..................................... 711/154; 711/105
(58) Field of Search ................................ 711/104, 105, 711/106, 154, 170; 365/238.5

(56) References Cited

U.S. PATENT DOCUMENTS

| | | | |
|---|---|---|---|
| 5,664,153 A | 9/1997 | Farrell | 711/154 |
| 5,893,917 A | 4/1999 | Derr | 711/105 |
| 6,219,764 B1 | 4/2001 | Jeddeloh | 711/154 |
| 6,219,765 B1 | 4/2001 | Jeddeloh | 711/154 |
| 6,286,075 B1 * | 9/2001 | Stracovsky et al. | 711/5 |
| 6,363,460 B1 * | 3/2002 | Jeddeloh | 711/154 |

OTHER PUBLICATIONS

Shanley, Tom, and Don Anderson, *ISA System Architecture*, Addison–Wesley Publishing Company, 1995, Chap. 13, "RAM Memory: Theory of Operation," pp. 235–272. (+ Table of Contents).

* cited by examiner

*Primary Examiner*—Kevin L. Ellis
(74) *Attorney, Agent, or Firm*—Dorsey & Whitney LLP

(57) ABSTRACT

An apparatus is described for controlling data transfer operations between a memory having a plurality of addressable pages and a device operable to write data to and read data from the memory. A memory controller couples the device with the memory and includes a register for storing an open page address. The memory controller receives a read or write request from the device, together with an address corresponding with the requested page from or to which the read or write is to be performed. The memory controller includes an address comparator which compares the requested page address with the stored open page address to determine whether the requested page is already open. The memory controller then initiates the appropriate sequence of memory operations to effect the requested read or write data transfer. If a read request, the requested memory page is left open after completion of data transfer operations. If a write request, the requested memory page is closed and precharged following completion of the data transfer operations.

9 Claims, 4 Drawing Sheets

MEMORY PAGING CONTROL APPARATUS

CROSS-REFERENCE TO RELATED APPLICATION

This application is a continuation of U.S. patent application Ser. No. 09/128,410, filed Aug. 3, 1998 now U.S. Pat. No. 6,219,765.

TECHNICAL FIELD

The present invention relates generally to circuitry and protocols associated with operating a memory device, and more particularly, to apparatus for controlling paging operations in a memory device.

BACKGROUND OF THE INVENTION

FIG. 1 is a simplified functional diagram of a memory device 200 that represents any of a wide variety of currently available memory devices. The central memory storage unit of the memory device 200 is a memory array 202 which is typically arranged in a plurality of banks, with two such banks 204A and 204B shown in the Figure. The memory array 202 includes a plurality of individual memory elements (not shown) for storing data, with the memory elements typically arranged in separately addressable rows and columns. Those skilled in the art oftentimes refer to a collectively addressable subset of the array 202 as a "page." Typically, a single row of memory elements in a bank of the array constitutes a particular page. In FIG. 1, a plurality of pages 206A and 206B are depicted, corresponding with banks 204A and 204B, respectively.

As known to those skilled in the art, particular locations within the memory array 202 are addressable by Address signals that external circuitry (not shown) provides to the memory device 200. Also, external circuitry provides a plurality of Control or command signals that are used to designate the particular memory access type and/or sequence of memory accesses. As depicted in FIG. 1, a control/address logic circuit 208 receives the Control signals and Address signals, which may be provided in parallel signal paths, serially, or some combination. The control/address logic circuit 208 then applies a plurality of internal control signals to control the timing and sequence of operations accessing the banks 204A and 204B via access circuits 210A and 210B, respectively. Those skilled in the art will understand that the depicted access circuits 210A and 210B represent a collection of various functional circuit components commonly found in memory devices. Examples include row and column address latch, buffer, and decoder circuits, sense amplifiers and I/O gating circuitry, and other well-known circuits adapted for particular memory device implementations. Data written to and read from the memory array 202 is transferred from and to external circuitry via a data I/O circuit 212 and the access circuits 210A and 210B.

When access to a particular memory page is complete, and the memory page is then "closed," a precharge operation is performed to prepare the memory device for a subsequent memory access. The precharge operation requires a certain amount of time for its completion, and therefore limits the speed with which a sequence of memory operations can be performed. By organizing the memory array 202 to have multiple banks 204A and 204B with associated multiple access circuits 210A and 210B, the precharge time can, in some instances, be "hidden." For example, if a first memory access is to bank 204A, and a subsequent memory access is to bank 204B, precharge operations associated with bank 204A can occur while initiating memory access operations to bank 204B. However, successive memory access operations to a single bank still result in precharge time intervals during which memory access operations cannot be performed.

Some attempts have been made to minimize those data transfer interruptions caused by precharge time intervals. By leaving a page "open" after completing a memory access operation to that page, the precharge time penalty is avoided when a subsequent bank access is to that very same page (a "page hit"). However, when a subsequent bank access is to a different page (a "page miss"), the open page must then be closed and the precharge operation performed before memory access operations can proceed. Therefore, while there exist benefits to leaving a page open in the event there are frequent page hits, there exist significant time penalties associated with a large number of page misses.

SUMMARY OF THE INVENTION

In accordance with the present invention, an apparatus is provided for controlling data transfer operations between a memory and a device operable to write data to and read data from the memory. The memory is organized as a plurality of pages, and a memory controller couples the device and the memory. The memory controller includes a register for storing a page address corresponding to an open page. The memory controller receives a data transfer request and an address corresponding with the requested page to or from which the data transfer is to be performed. The memory controller includes an address comparator that compares the requested page address with the stored page address to determine whether the requested page is already open. If the requested page is open, a control state machine included within the memory controller then initiates data transfer operations between the device and the requested memory page. If the requested memory page is closed, the control state machine first opens the requested memory page and subsequently initiates the data transfer operations therewith. The control state machine also determines whether the requested data transfer is a read request or a write request. If a read request, the requested memory page is left open after completion of data transfer operations. If a write request, the requested memory page is closed following completion of the data transfer operations.

DETAILED DESCRIPTION

The following describes a novel apparatus for controlling data transfer operations between a memory and a device in, for example, a computer system. Certain details are set forth to provide a sufficient understanding of the present invention. However, it will be clear to one skilled in the art, that the present invention may be practiced without these particular details. In other instances, well-known circuits, control signals, timing protocols, and software operations have not been shown in detail in order to avoid unnecessarily obscuring the invention.

Figure 1:
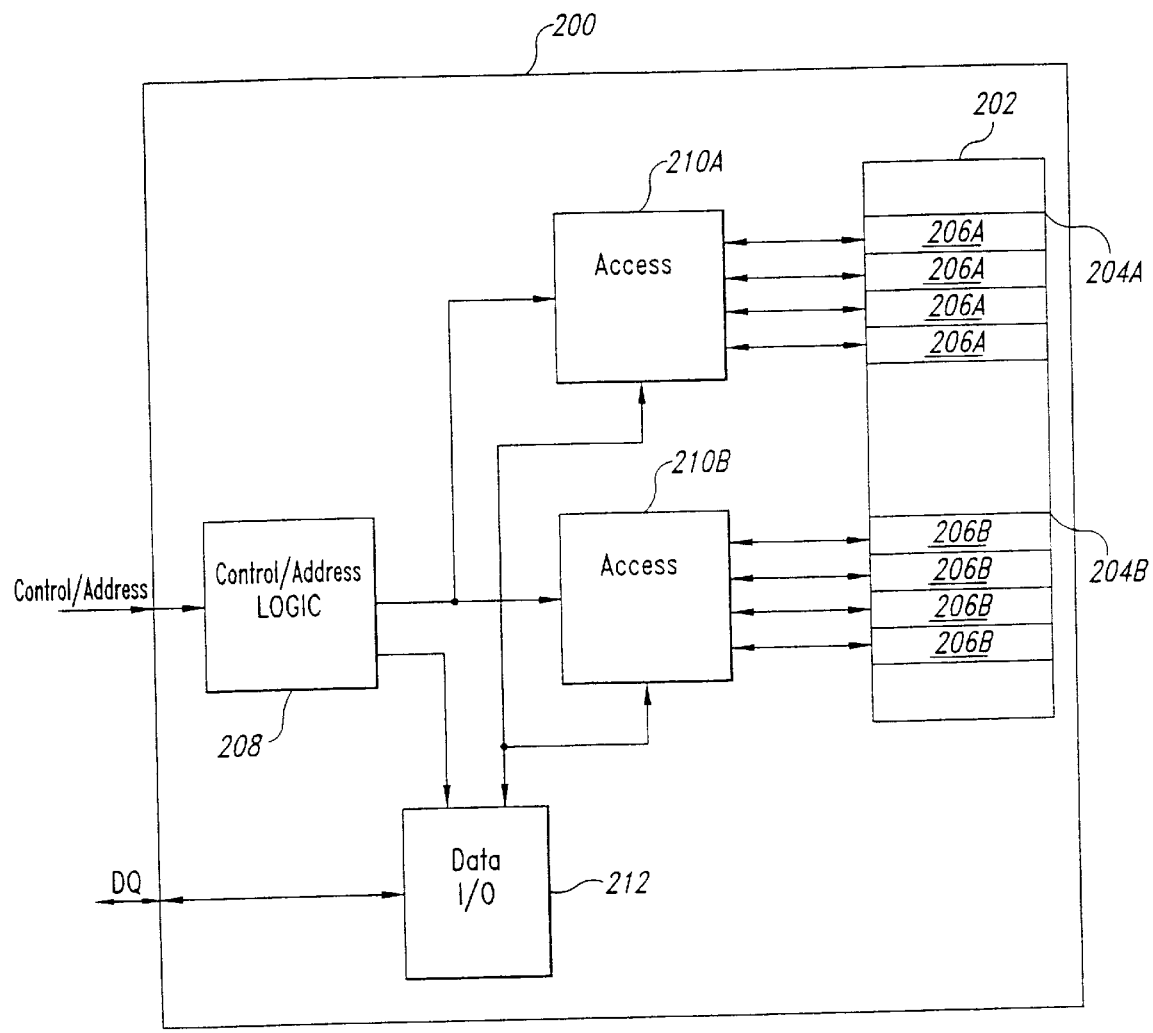
FIG. 1 is a functional block diagram of a memory device according to the prior art.
Figure 2:
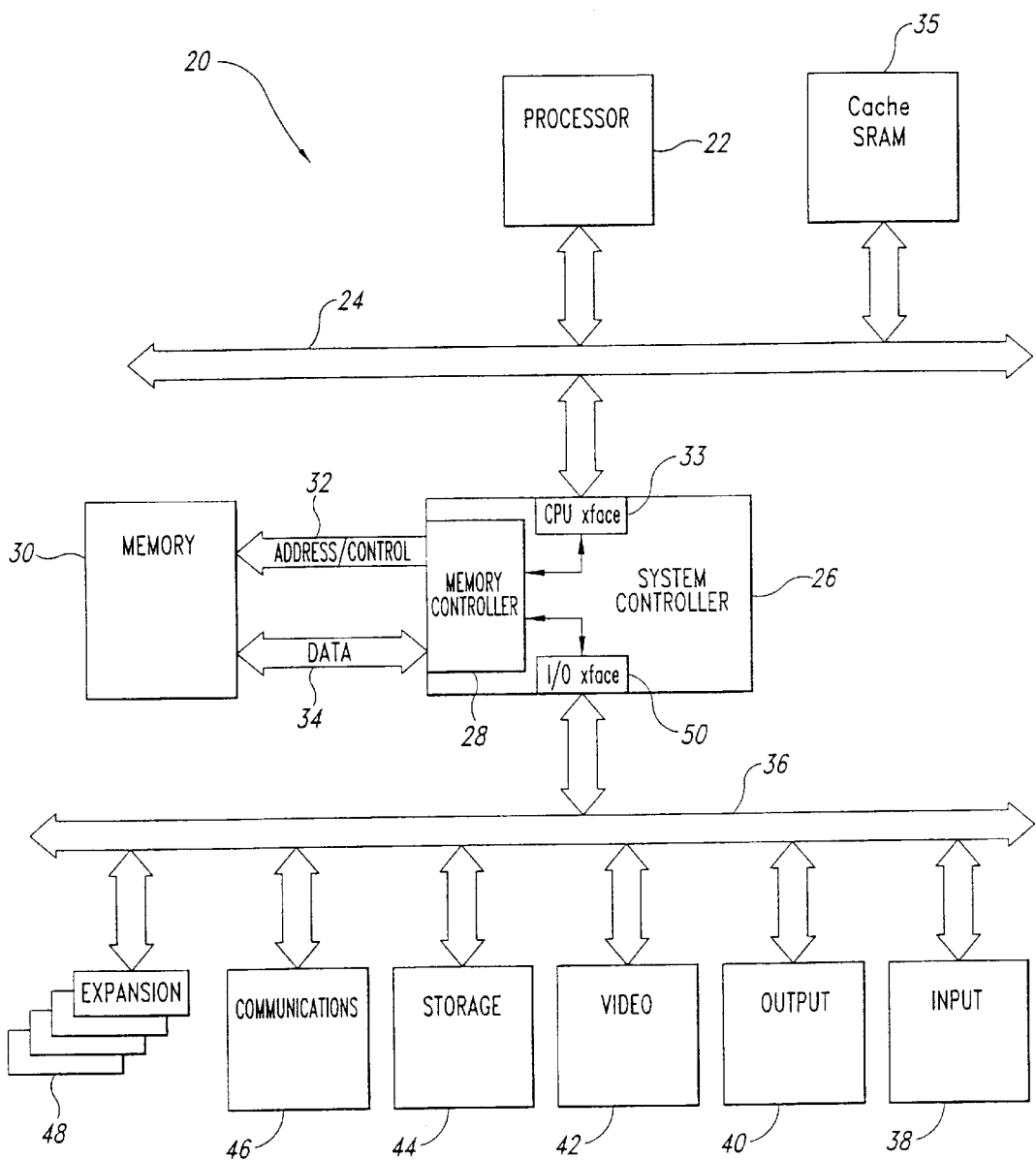
FIG. 2 is a functional block diagram of a computer system including a system controller in accordance with an embodiment of the present invention.

FIG. 2 shows a computer system 20 in accordance with an embodiment of the present invention. A central processing unit (CPU), such as a microprocessor 22, is coupled with a system controller 26 by a processor bus 24 that carries address, data, and control signals therebetween. The system controller 26 includes a memory controller 28 for accessing a main memory 30 via a memory address/control bus 32 and a memory data bus 34. As understood by those skilled in the art, the address/control bus 32 may itself be separate, parallel address and control signal paths, or the address and control information may be provided serially, or in some other suitable combination. The main memory 30 may include any of a wide variety of suitable memory devices. Example memory devices include dynamic random access memory (DRAM) devices such as synchronous DRAMs, SyncLink DRAMs, or RAMBUS DRAMs, and may include multiple separately addressable memory banks, as described above in connection with FIG. 1.

The system controller 26 includes CPU interface circuitry 33 that couples the microprocessor 22 with other components of the system controller, such as the memory controller 28. The system controller 26 also includes a cache controller (not shown) for controlling data transfer operations to a cache memory 35 that provides higher speed access to a subset of the information stored in the main memory 30.

The system controller 26 also functions as a bridge circuit (sometimes called a North bridge) between the processor bus 24 and a system bus, such as I/O bus 36. The I/O bus 36 may itself be a combination of one or more bus systems with associated interface circuitry (e.g., AGP bus and PCI bus with connected SCSI and ISA bus systems). Multiple I/O devices 38–46 are coupled with the I/O bus 36. A data input device 38, such as a keyboard, a mouse, etc., is coupled with the I/O bus 36. A data output device 40, such as a printer, is coupled with the I/O bus 36. A visual display device 42 is another data output device that is commonly coupled with the I/O bus 36. A data storage device 44, such as a disk drive, tape drive, CD-ROM drive, etc., is coupled with the UO bus 36. A communications device 46, such as a modem, local area network (LAN) interface etc., is coupled with the I/O bus 36. Additionally, expansion slots 48 are provided for future accommodation of other I/O devices not selected during the original design of the computer system 20.

FIG. 2 depicts the various I/O devices 38–46 as being coupled with the system controller 26 via a single, shared I/O bus 36 and an I/O interface 50 integrated within the system controller. However, those skilled in the art will understand that one or more of the I/O devices 38–46 may have separately dedicated interface connections to the system controller 26, in which case the single depicted I/O interface 50 will be understood as a representation for a plurality of separately dedicated and adapted I/O interfaces. Alternatively, one or more of the I/O devices 38–46 may be coupled with the system controller 26 via a multiple bus and bridge network. As a further alternative, one or more of the I/O devices 38–46 may be coupled with the system controller 26 partly through a shared bus system and party through separately dedicated signal line connections. Indeed, those skilled in the art will understand the depiction of FIG. 2 to encompass any of a wide variety of suitable interconnection structures between the memory 30, the memory controller 28, and the I/O devices 38–46.

Figure 3:
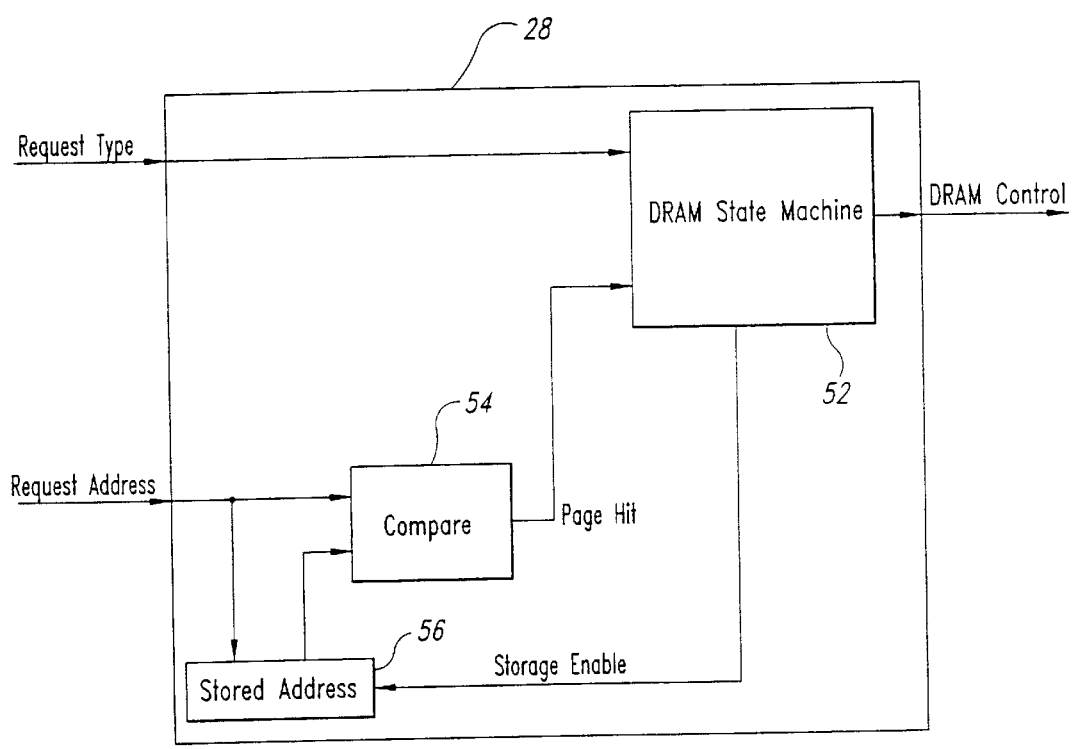
FIG. 3 is a functional block diagram depicting a portion of a memory controller included in the system controller of FIG. 2.

FIG. 3 is a functional block diagram depicting a portion of the memory controller 28. The memory controller 28 includes a DRAM state machine 52, which produces the well-known control signal sets and sequences to effect various memory access operations. Example control signals include the well known row address strobe (RAS), column address strobe (CAS), write enable (WE), and/or other memory control signals appropriate to the particular memory device or devices included within the main memory 30. The DRAM state machine 52 produces the appropriate set and sequence of control signals in response to receiving a Request Type signal. The Request Type signal has first and second states corresponding to requests for a read data transfer and write data transfer, respectively. A Request Address is also provided to the memory controller 28 and corresponds with a location in the main memory 30 (see FIG. 2) to or from which the write or read data transfer is to be performed. Both the Request Type signal and the Request Address are provided to the memory controller 28 by the CPU interface 33 or the I/O interface 50 in response to corresponding signals produced by the microprocessor 22 or one of the I/O devices 38–46 requesting the read or write operation (see FIG. 2).

The Request Address is received at one of two inputs to a comparator 54 included within the memory controller 28. The other of the comparator inputs receives a Stored Address from a page address register 56. The Stored Address corresponds to an open page in the main memory 30, and the comparator 54 produces a compare output signal having first and second states corresponding to whether the Request Address and the Stored Address match. A match of the Request Address and Stored Address constitutes a page hit, in which case the DRAM state machine 52 produces a set of control signals to initiate access to the already open page in the main memory 30, as will be understood to those skilled in the art. If, on the other hand, the Request Address and Stored Address do not match (i.e., a page miss), the comparator 54 produces a deasserted signal causing the DRAM state machine 52 to produce a sequence of control signals first opening the requested memory page and then initiating access to that page.

The page address register 56 receives the Request Address and updates the value of the Stored Address by selectively registering the Request Address in response to a Storage Enable signal produced by the DRAM state machine 52. In accordance with an embodiment of the present invention, the memory controller 28 provides a paging policy in which the memory page to which a read access has occurred is left open. Following a read access, the DRAM state machine 52 then asserts the Storage Enable signal to update the value stored in the page address register 56 to correspond with the Request Address to which the read operation was performed. Following a write access to a memory page, that memory page is closed and precharge operations are performed.

In a preferred embodiment, no more than a single memory page is open at any given time. Alternatively, multiple pages may be left open as long as no more than a single memory page is open in any one bank of the memory. If multiple pages are to be left open, the page address register 56 is then adapted to store multiple addresses, each corresponding with an open memory page in a respective memory bank. The comparator 54 is then also adapted to compare the Request Address to the multiple stored addresses to determine whether a page hit occurs.

Figure 4:
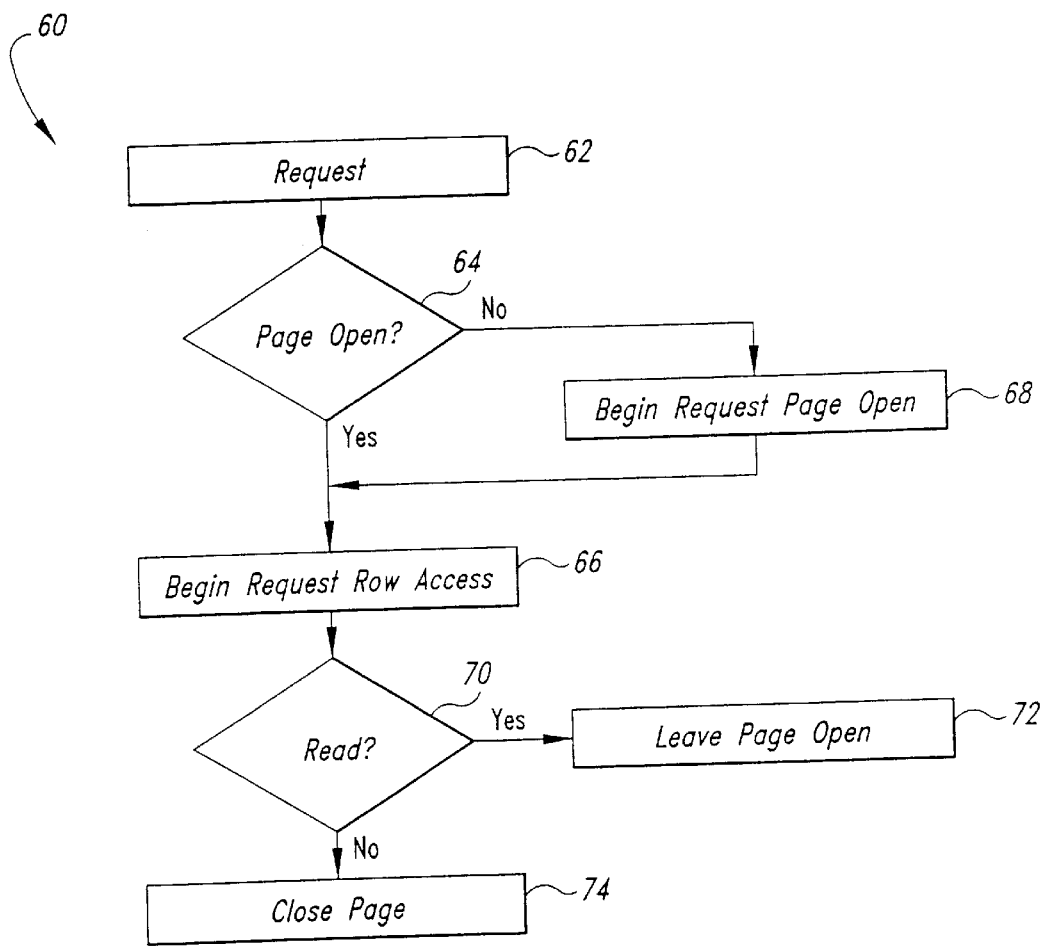
FIG. 4 is a process flow diagram depicting operations of the computer system and memory controller of FIGS. 2 and 3.

FIG. 4 is a process flow chart depicting operations of the computer system and memory controller of FIGS. 2 and 3—particularly, a method 60 of operating the memory 30. The memory controller 28 receives a memory access Request at step 62, which includes both indication of the type (read or write) of memory access request together with a corresponding memory address. The memory controller 28 performs a conditional branch test at step 64, in which it is determined whether the addressed memory page is already open. If the memory page is open, the memory controller 28 initiates the requested memory access to that page in step 66. If the requested page is not open, the memory controller 28 first opens the requested page at step 68, whereupon the process flow is routed to step 66 in which the memory controller performs the requested access to the now open page. The memory controller 28 performs a conditional branch test in step 70 in which it is determined whether the Request is a read. If the Request is a read, the memory controller 28 leaves the accessed page open in step 72. However, if the requested access is not a read, the memory controller 28 then closes the accessed page and performs precharge operations in step 74.

Each of the circuits whose function and interconnection is described in connection with FIGS. 1–3 is of a type known in the art. One skilled in the art will be readily able to adapt such circuits in the described combination to practice the present invention. The internal details of these particular circuits are not critical to the invention, and a detailed description of the internal circuit operation need not be provided. Similarly, each one of the process steps described in connection with FIG. 4 is of a type well known in the art, and may itself be a sequence of operations that need not be described in detail in order for one skilled in the art to practice the present invention.

A number of advantages are provided by the above-described embodiments of the present invention. Given that many read operations represent cache or buffer fill operations, the probability is relatively high that, following a given read operation, a next read operation will be performed to the same memory page. However, a subsequent read operation to another of the memory banks is relatively unlikely to be a page hit in that memory bank, and so the preferred embodiment keeps open only a single memory page. Significant precharge time penalties are then avoided except in the situation where a read page miss occurs in the bank having the open page. In the event a write access to a bank immediately follows a read access to that bank, the time penalty associated with precharge operations is still largely avoided. This is because write data can be latched into the memory device (see I/O circuit 212 of FIG. 1) even while precharge operations are performed at the array and associated access circuitry (see access circuits 210A and 210B of FIG. 1).

Most modern systems provide "read around write" capability and use write buffers to reorder and combine write operations to minimize the frequency of write operations to memory. Following completion of a given set of write operations, therefore, it is relatively improbable that a subsequent write operation will also be to the same page. Also, as described above, any precharge time penalties associated with subsequent write operations are minimal compared to those associated with subsequent read operations. Further, since write operations are typically combined in today's systems, it is most likely that a next operation will be a read operation, such as a code fetch to an area of memory not located in the page to which the previous write operation occurred. Therefore, embodiments of the present invention provide an optimal paging policy in which a memory page is left open only following a read access, while the memory page is closed and precharge operations are performed following a write access. These and other advantages will be appreciated by those skilled in the art.

From the foregoing it will be appreciated that, although specific embodiments of the invention have been described herein for purposes of illustration, various modifications may be made without deviating from the spirit and scope of the invention. Those skilled in the art will appreciate that many of the advantages associated with the circuits described above in connection with FIGS. 2–4 may be provided by other circuit configurations. Indeed, a number of suitable circuit components can be adapted and combined in a variety of circuit topologies to implement the control of memory device paging operations in accordance with the present invention. Accordingly, the invention is not limited by the disclosed embodiments, but instead the scope of the invention is determined by the following claims.

What is claimed is:

1. A computer system, comprising:

a memory operable to store data;

a device operable to read data from and write data to the memory; and a memory controller coupling the memory with the device and operable to apply a plurality of control signals to the memory to control data transfer operations between the device and the memory, the memory controller operable to place the memory in a first state subsequent to the device reading data from the memory, the first state leaving open a page of memory from which the data was read, and the memory controller further operable to place the memory in a state other than the first state subsequent to the device writing data to the memory, the state other than the first state closing the page of memory to which the data was written.

2. The computer system according to claim 1 wherein the memory stores data in a plurality of memory pages, each being identified by a corresponding page address.

3. In a system having a device operable to write data to and read data from a memory having a plurality of addressable memory pages, a memory controller coupling the device with the memory and adapted to receive a request type signal and a request page address, the request type signal having write and read states and the request page address corresponding with a memory page to or from which the device has requested to write or read data, respectively, the memory controller comprising:

a control state machine operable to receive the request type signal and to responsively apply a plurality of control signals to the memory controlling the operation thereof, the control state machine responding to the request type signal of the read state to initiate reading data from the memory page corresponding with the request page address and to leave open the memory page, the control state machine responding to the request type signal of the write state to initiate writing data to the memory page corresponding with the request page address and to close the memory page.

4. A computer system, comprising:

a memory operable to store data;

a device operable to read data from and write data to the memory; and a memory controller coupling the memory with the device and operable to apply a plurality of control signals to the memory to control data transfer operations between the device and the memory, the memory controller operable to store a memory page address for memory in a first state, to receive a requested memory address in the data transfer operation, and to compare the requested address to the stored address to determine if the memory is in the first state; and the memory controller operable to place the memory in the first state subsequent to the device reading data from the memory, the memory controller further operable to place the memory in a state other than the first state subsequent to the device writing data to the memory.

5. The computer system of claim 4 wherein the first state is an open memory page.

6. The computer system of claim 4 wherein the state other than the first state is a closed memory page.

7. The computer system of claim 4 wherein the first state is an open memory page and the state other than the first state is a closed memory page.

8. The computer system according to claim 4 wherein the memory stores data in a plurality of memory pages, each being identified by a corresponding page address, wherein the memory controller includes a register, and wherein placing the memory in the state other than the first state includes closing a memory page to which the device wrote data and storing a value in the register corresponding to none of the addresses of the memory pages.

9. The memory controller according to claim 4, further comprising:

a register operable to store the page address; and an address comparator operable to receive and compare the request page address with the stored page address and to responsively produce an address compare signal having asserted and deasserted states, the address compare signal having an asserted state when the request page address matches the stored page address;

and wherein the control state machine responds to the address compare signal of the deasserted state to open the memory page corresponding with the request page address, the memory control machine further responding to the request type signal of the read state to modify the stored page address to correspond with the request page address.

* * * * *